US010509185B2

(12) United States Patent
Jiang et al.

(10) Patent No.: US 10,509,185 B2
(45) Date of Patent: Dec. 17, 2019

(54) OPTICAL CONNECTOR WITH PHOTODETECTOR, ADAPTOR FOR OPTICAL CONNECTOR, AND SYSTEM

(71) Applicants: Zhiping Jiang, Kanata (CA); Suet Yuen, Kanata (CA)

(72) Inventors: Zhiping Jiang, Kanata (CA); Suet Yuen, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/440,759

(22) Filed: Feb. 23, 2017

(65) Prior Publication Data

US 2017/0315317 A1    Nov. 2, 2017

Related U.S. Application Data

(60) Provisional application No. 62/328,184, filed on Apr. 27, 2016.

(51) Int. Cl.
    *G02B 6/42*    (2006.01)
    *G02B 6/28*    (2006.01)
    (Continued)

(52) U.S. Cl.
    CPC ......... *G02B 6/4286* (2013.01); *G02B 6/2852* (2013.01); *G02B 6/34* (2013.01);
    (Continued)

(58) Field of Classification Search
    CPC ...... G02B 6/4286; G02B 6/2852; G02B 6/34; G02B 6/3845; G02B 6/3885;
    (Continued)

(56) References Cited

U.S. PATENT DOCUMENTS 4,097,800 A * 6/1978 Kuchmas, Jr. .......... G01P 3/685
                                                    250/222.2
4,881,789 A * 11/1989 Levinson ............. G02B 6/2852
                                                    385/48
(Continued)

FOREIGN PATENT DOCUMENTS

CA    2494133 C    6/2011
CN    1393715 A    1/2003
(Continued)

OTHER PUBLICATIONS

K. Feder et al., A compact, low resolution, wavelength monitor applied to Raman pump power monitoring, OFC 2003 Optical Fiber Communications Conference, US, IEEE, vol. 1, Mar. 2003, pp. 42-43.

*Primary Examiner* — Nay Tun (57) ABSTRACT

In various aspects, an optical connector with a built-in photodetector for detecting light in the optical connector; an adapter for detachably receiving an optical connector, comprising an electrode configured to electrically contact an electrode of the optical connector; a connection apparatus comprising an arrangement of adapters for detachably receiving a plurality of optical connectors, each adapter comprising an electrode configured to electrically contact an electrode of the respective optical connector; a system with an interface configured to make an optical connection with an optical connector and a processing unit configured to receive from the connector an indication and to generate a feedback signal indicative of said indication; and/or an optical connector responsive to light to generate an electrical signal is provided.

27 Claims, 8 Drawing Sheets

(51) Int. Cl.
   *G02B 6/34* (2006.01)
   *G02B 6/38* (2006.01)
   *H04B 10/075* (2013.01)
   *H04B 10/079* (2013.01)
(52) U.S. Cl.
   CPC ......... *G02B 6/3845* (2013.01); *G02B 6/3885* (2013.01); *G02B 6/3895* (2013.01); *G02B 6/4292* (2013.01); *H04B 10/075* (2013.01); *H04B 10/07955* (2013.01); *G02B 6/4287* (2013.01)
(58) Field of Classification Search
   CPC .. G02B 6/3895; G02B 6/4292; G02B 6/4287; H04B 10/075; H04B 10/07955; H05K 999/99
   See application file for complete search history.

(56) References Cited

U.S. PATENT DOCUMENTS

| | | | |
|---|---|---|---|
| 5,825,516 A * | 10/1998 | Walsh | G01M 11/33 398/40 |
| 5,850,302 A | 12/1998 | Strasser et al. | |
| 6,186,670 B1 * | 2/2001 | Austin | G02B 6/3825 385/55 |
| 6,367,984 B1 * | 4/2002 | Stephenson | G02B 6/3825 385/53 |
| 6,733,186 B2 | 5/2004 | Pfleger et al. | |
| 7,095,931 B2 | 8/2006 | Sezerman et al. | |
| 7,295,731 B2 | 11/2007 | Sezerman et al. | |
| 2002/0197018 A1 | 12/2002 | Lampert | |
| 2004/0022494 A1 * | 2/2004 | Liddle | G02B 6/3636 385/48 |
| 2008/0069497 A1 * | 3/2008 | Tissot | G02B 6/29317 385/37 |
| 2010/0329604 A1 | 12/2010 | Kojima et al. | |
| 2015/0323752 A1 | 11/2015 | Gaber | |

FOREIGN PATENT DOCUMENTS

| | | |
|---|---|---|
| CN | 105242361 A | 1/2016 |
| JP | H03276107 A | 12/1991 |
| JP | 2006165651 A | 6/2006 |
| KR | 20080003318 A | 1/2008 |

* cited by examiner

OPTICAL CONNECTOR WITH PHOTODETECTOR, ADAPTOR FOR OPTICAL CONNECTOR, AND SYSTEM

CROSS-REFERENCE TO RELATED APPLICATION

The present application claims the benefit of U.S. Provisional Patent Application Ser. No. 62/328,184, filed on Apr. 27, 2016, hereby incorporated by reference herein.

TECHNICAL FIELD

The present application relates generally to optical communications systems and, in particular, to connectors used to interconnect optical fibers in such systems.

BACKGROUND

To effectively manage optical connections between many pairs of optical fibers, it is useful to have visibility into whether the correct connections have been made as well as the power level of light travelling through such connections. To this end, it is important to access the light that is traveling through the optical fibers being connected. However, as modern optical systems have increasingly dense fiber connections, the space taken up by conventional diagnostic solutions becomes an inconvenience.

SUMMARY

According to a first non-limiting aspect, there is provided an optical connector, e.g. an optical fiber connector, comprising a built-in photodetector for detecting light in the optical connector. The photodetector may be coupled to an optical tap coupled to an optical fiber for propagating the light, or integrated into the optical fiber, in the connector. An electrode disposed e.g. on the periphery of the connector may be coupled to the photodetector for conveying photoelectric signal generated by the photodetector in response to receiving the tapped portion of the light. An external interface, such as a light-emitting device, a sound source, etc., may also be provided to convey a signal indicative of an output of the photodetector.

According to a second non-limiting aspect, there is provided an adapter for detachably receiving an optical connector e.g. the optical connector described above, comprising an electrode configured to electrically contact an electrode of the optical connector.

According to a third non-limiting aspect, there is provided a connection apparatus comprising an arrangement of adapters for detachably receiving a plurality of optical connectors e.g. the optical connectors described above, each adapter comprising an electrode configured to electrically contact an electrode of the respective optical connector.

According to a fourth non-limiting aspect, there is provided a system, which comprises an interface configured to make an optical connection with an optical connector e.g. the optical connector described above; and a processing unit configured to receive from the connector an indication and to generate a feedback signal indicative of said indication. The interface may include an electrode configured to make an electrical connection with the connector, and the system may include a source of electrical power for the optical connector, the electrical power being provided via the electrode.

According to a fifth non-limiting aspect, there is provided an optical connector responsive to light to generate an electrical signal, which may optionally be converted to an optical or an audible signal representative of a parameter, e.g. an optical power level, of the light.

These and other aspects and features of the present invention will now become apparent to those of ordinary skill in the art upon review of the following description of specific embodiments in conjunction with the accompanying drawings.

It should be understood that the drawings are an aid to understanding certain aspects or embodiments, and are not to be construed as limiting.

DETAILED DESCRIPTION

Non-limiting areas of applicability of embodiments of the present invention may include detecting the presence of light traveling along an optical fiber and monitoring the power level and/or optical signal-to-noise ratio (OSNR) of light traveling along the optical fiber.

Figure 1A:
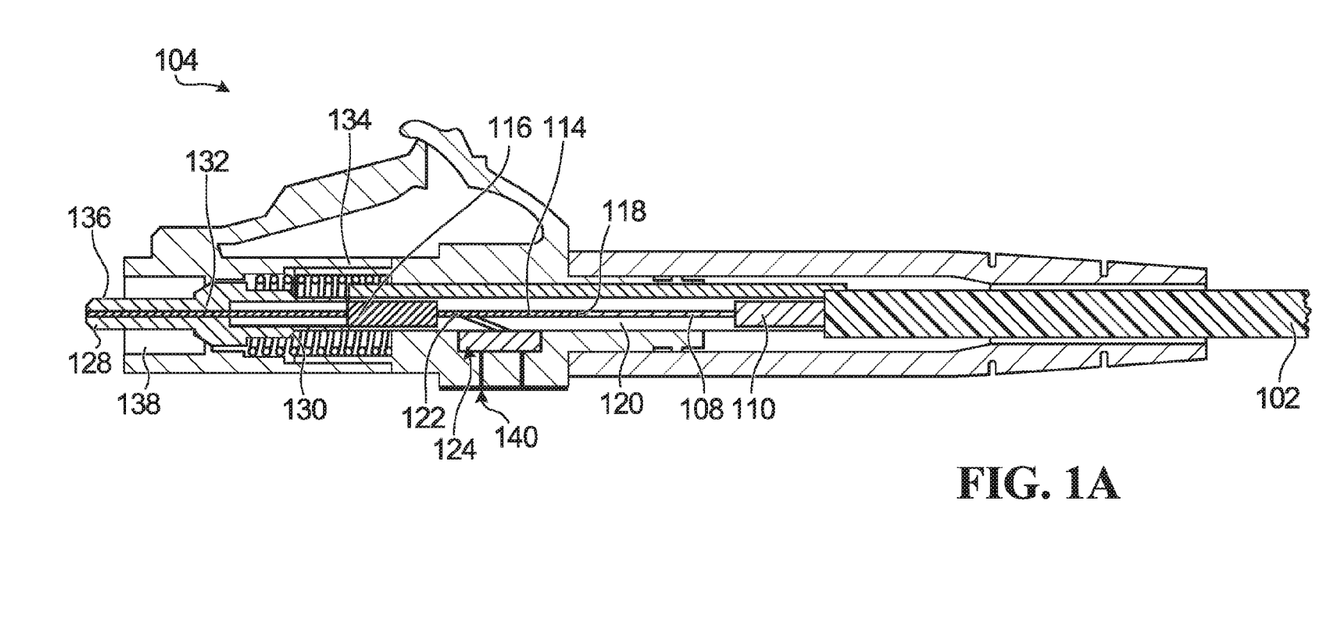
FIG. 1A is a schematic view an optical fiber cable terminated by a photodetector-enabled connector, in accordance with a non-limiting embodiment.
Figure 1B:
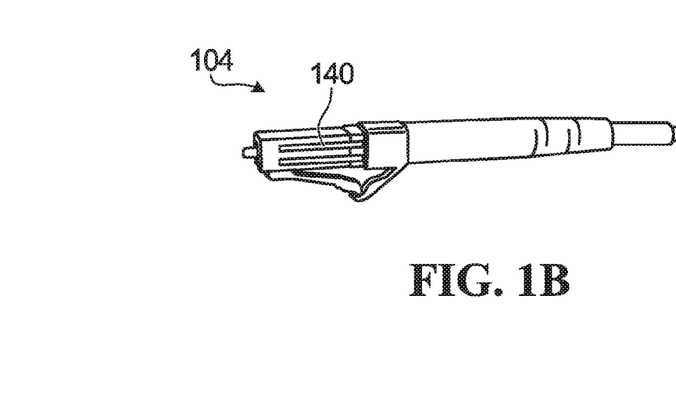
FIG. 1B is a perspective view of the optical fiber cable and a photodetector-enabled connector of FIG. 1A.

FIGS. 1A and 1B show an optical fiber cable 102 terminated by a photodetector-enabled connector 104 in accordance with a non-limiting embodiment. The optical fiber cable 102 may comprise a length of optical fiber, which may comprise a bare fiber 108 and a fiber jacket 110 (shown partly removed in FIG. 1A), which wraps around the bare fiber 108. For its part, the photodetector-enabled connector 104 has a main optical conduit, which may also comprise a length of optical fiber, including a bare fiber 114 and an optional fiber jacket or a ferrule 116 (also shown partly removed in FIG. 1A), which surrounds the bare fiber 114 for additional support. The term "bare fiber" is used herein to designate a core and a cladding surrounding the core.

The bare fiber 108 of the main optical fiber and the bare fiber 114 of the connector's main optical conduit are aligned and joined together at a splice point 118. If the bare fibers 108, 114 are fused, their alignment may be retained by such fusion. A splice-protecting sleeve 120 may provide mechanical protection of the respective bare fibers at the splice point 118. In some types of optical fibers, such as single-mode fibers, for example, the bare fiber 108, 114 may have a core with a diameter of <10 micrometers surrounded by a fused silica cladding having a diameter of 125 micrometers, with the fused silica claddings of the two bare fibers 108, 114 being spliced at the splice point 118. In this case, the bare fiber 108 as illustrated in FIG. 1A may correspond to the core together with the silica cladding. In other embodiments, such as, for example, in the case of multimode optical fibers having larger core diameters (e.g. 125 micrometers, 250 micrometers and larger), the core may be thick enough that a polymer cladding may be used instead of a fused silica cladding.

The photodetector-enabled connector 104 further includes an optical tap 122 and a built-in (or integrated) photodetector 124. The optical tap 122 is coupled to the main optical conduit and is connected to the built-in photodetector 124. An electrical preamplifier (not shown) may also be provided in this or other embodiments. The electrical preamplifier may amplify an electrical output of the built-in photodetector 124. The optical tap 122 may comprise a portion of cladding surrounding the core of the bare fiber 114 having a varied refractive index for tapping light. The optical tap 122 may comprise a Bragg grating in the main optical fiber of the main optical conduit, suitably configured for tapping light. The optical tap 122 may be located at any convenient point along the main optical conduit, e.g. to the left (closer to the tip) or to the right of the built-in photodetector 124 shown in FIG. 1A. When multiple individual optical fibers occupy the main optical conduit, a commensurate number of optical taps 122 and photodetectors may be provided.

The optical tap 122 may also be a directional optical coupler, in which case the photodetector detects light passing in only one direction along the main optical conduit. In other embodiments, two built-in photodetectors 124 may be connected to the same main optical fiber via respective optical taps 122, allowing light traveling in either/both directions of the main optical conduit to be detected via respective built-in photodetectors 124. Non-limiting examples of a built-in photodetector 124 that may be used in embodiments of the invention include Si and InGaAs PIN photodetectors.

The photodetector-enabled connector 104 further includes an external interface. The external interface includes a light-carrying port 128 that allows light to enter and exit the photodetector-enabled connector 104. The external interface may also include various mechanical connection elements such as a spring 130, a plug 132, a frame stopper 134, a ferrule 136 and a housing 138. The mechanical connection elements may be arranged so as to allow the photodetector-enabled connector 104 to robustly and compactly connect into a connection apparatus such as a backplane, motherboard, patch panel or faceplate.

In this embodiment, the external interface further includes an electrical interface 140, which may include one, two or more electrodes, pins, connectors or the like. The electrical interface 140 of the photodetector-enabled connector 104 is configured to convey an electrical signal indicative of an output of the built-in photodetector 124. Information contained in the electrical signal conveyed by the electrode may be processed by a processing unit (not shown in FIGS. 1A and 1B), based on which an power level of light travelling through the photodetector-enabled connector 104 and/or an optical signal-to-noise ratio (OSNR) of an optical signal and/or a quality of the connection established by the photodetector-enabled connector 104 connector may be assessed and the result may be signaled to a user via, e.g., an output device (not shown in FIGS. 1A and 1B). Various architectures involving the processing unit and the output device will be described later on.

In the embodiment of FIGS. 1A and 1B, the electrical interface 140 is illustrated as an electrode, but this is by no means to be considered limiting. The electrical interface 140 may be disposed at a periphery of the photodetector-enabled connector 104 so as to be accessible to and visible by the user. This would allow the user to rapidly assess, using visual cues, whether a given connector being used is a standard connector or, as in the case of the photodetector-enabled connector 104, is a photodetector-enabled connector that enables enhanced functionality as described herein.

In the embodiment of FIGS. 1A and 1B, the built-in photodetector 124 is "active", i.e., operates in a photoconductive regime, and as such requires a bias voltage, but this is by no means to be considered limiting. The bias voltage may be supplied to the built-in photodetector 124 via the electrical interface 140 from outside the photodetector-enabled connector 104 (i.e., off-connector), along a conductor provided by, e.g., a backplane, motherboard, patch panel or faceplate.

The embodiments of FIGS. 2, 3, 4 and 5, now to be described, pertain to various architectures adapted to establish an electrical connection to the photodetector-enabled connector 124, thereby to (i) provide the bias voltage to the built-in photodetector 124 via the electrical interface 140 and/or (ii) to process information contained in the electrical signal output by the built-in photodetector 124 via the electrical interface 140.

Each of FIGS. 2, 3, 4 and 5 illustrates an example of a connection apparatus (in this case, a faceplate 202) connected to an optical board 204 (e.g., backplane, motherboard, patch panel). Optical signals travel to and from optical equipment on the optical board 204, such as switches, photodetectors, modulators, multiplexers, etc. The faceplate 202 is adapted to receive the photodetector-enabled connector 104 and make an optical connection to another light-carrying fiber (not shown) emanating from the optical board 204. Specifically, the faceplate 202 may include an adapter 206 with a mechanical interface adapted to receive the mechanical connection elements of the photodetector-enabled connector 104. The faceplate 202 may include multiple adapters similar to the adapter 206 for mechanically mating with multiple photodetector-enabled connectors 104, for increased connection density. The mechanical interface of the adapter 206 may have the form of a sleeve into which the photodetector-enabled connector 104 is inserted.

The adapter 206 further includes an electrical contact (e.g., electrode) 208 that engages with or otherwise contacts the electrical interface 140 of the photodetector-enabled connector 104 when the photodetector-enabled connector 104 is mechanically mated with the mechanical interface on the faceplate 202. As such, an electrical connection is made between the adapter 206 and the electrical interface 140, allowing a bias voltage to be applied to the built-in photodetector 124 and also allowing the electrical signals from the built-in photodetector 124 to reach outside the photodetector-enabled connector 104. In particular, a network of electrical connections (e.g., wires, vias, layers, etc.) joins the adapter 206 (and other similar adapters, if applicable) to a processing unit. Different architectures for locating the processing unit and the output device are now described.

Figure 2:
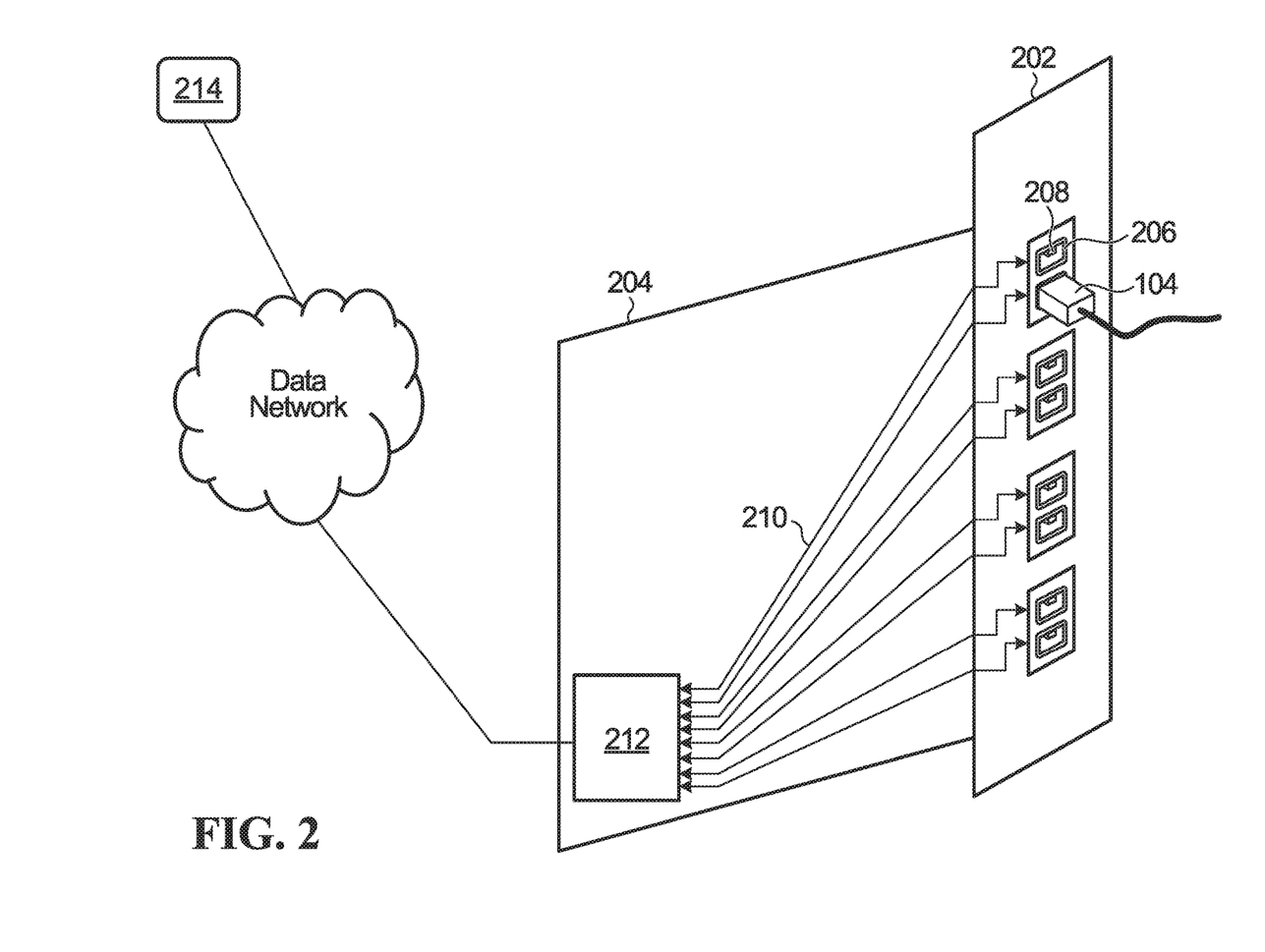
FIGS. 2, 3, 4 and 5 each show various embodiments of a faceplate with a plurality of adapters terminated by an interface for receiving a plurality of connectors such as the connector of FIG. 1A, and wherein an output device is external to the connector.

With specific reference to FIG. 2, a network of electrical connections 210 (e.g., wires, vias, layers, etc.) joins the adapter 206 (and other similar adapters, if applicable) to a processing unit 212 that is located on the optical board 204. The processing unit 212 may include a microprocessor, a memory, I/O and other standard components. The processing unit 212 may apply a data processing function (e.g., algorithm) to the electrical signals received from one or more photodetector-enabled connectors (such as the photodetector-enabled connector 104) representing the output of one or more built-in photodetectors (such as built-in photodetector 124). The output of the data processing function may be a diagnostic or other feedback signal for user consumption. The feedback signal can be transmitted over a data network (e.g., the Internet) to an output device 214, such as a console, handheld terminal, mainframe, mobile device, laptop, tablet, phablet, etc. The feedback signal may be transmitted wirelessly or over wired media. The feedback signal may be interpreted by an app running on a mobile phone, for example.

Figure 3:
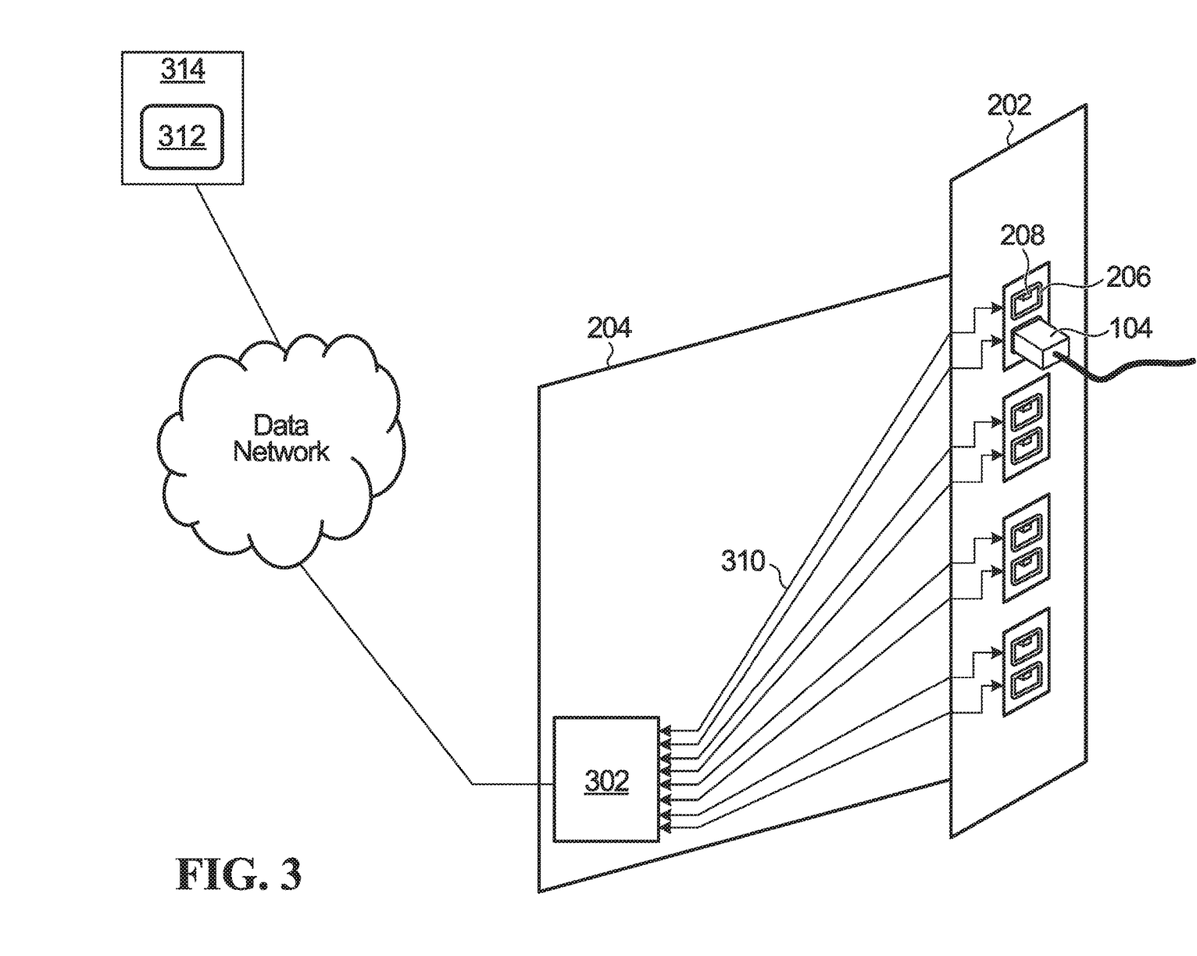

With specific reference to FIG. 3, a network of electrical connections 310 (e.g., wires, vias, layers, etc.) joins the adapter 206 (and other similar adapters, if applicable) to a multiplexer-demultiplexer 302, which bundles together the electrical signals from multiple adapters (and photodetector-enabled connectors) so as to transmit a multiplexed signal for processing by a processing unit 312 that may be remote relative to the optical board 204. For example, the multiplexed signal can be transmitted over a data network (e.g., the Internet). The processing unit 312 may include a microprocessor, a memory, I/O and other standard components. The processing unit 312 may apply a data processing function (e.g., algorithm) to the multiplexed signal. The output of the data processing function may be a diagnostic or other feedback signal for user consumption. The feedback signal may be conveyed to the user via an output device 314, such as a console, handheld terminal, mainframe, mobile device, laptop, tablet, phablet, etc.

Figure 4:
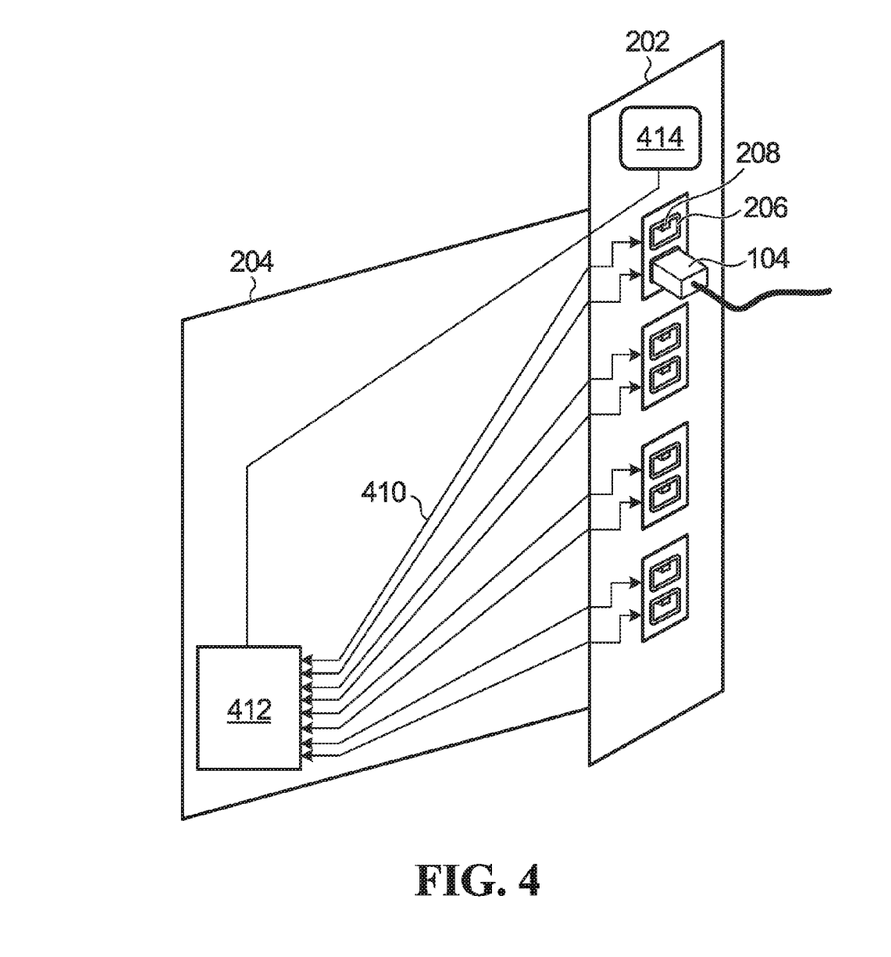

With specific reference to FIG. 4, a network of electrical connections 410 (e.g., wires, vias, layers, etc.) joins the adapter 206 (and other similar adapters, if applicable) to a processing unit 412 that is located on the optical board 204. The processing unit 412 may include a microprocessor, a memory, I/O and other standard components. The processing unit 412 may apply a data processing function (e.g., algorithm) to the electrical signals received from one or more photodetector-enabled connectors (such as the photodetector-enabled connector 104) representing the output of one or more built-in photodetectors (such as built-in photodetector 124). The output of the data processing function may be a diagnostic or other feedback signal for user consumption. The feedback signal can be transmitted to an output device 414 located on the optical board 204 or, as illustrated, on the faceplate 202. The output device 414 may be a LED, loudspeaker/sound alarm or other device that can be activated by the processing unit 412. In still other embodiments, the output device 414 may be a digital display to show, e.g., the power level of light (or OSNR of an optical signal) traveling through the photodetector-enabled connector 104.

To accurately report the power level at the photodetector-enabled connector 104, it may be useful to know both a tap ratio of the optical tap 122 and a responsivity of the built-in photodetector 124. The tap ratio (or tapping ratio, or splitting ratio) can be measured as the power output of an individual split port divided by the total power output of all split ports. As for responsivity, this parameter corresponds to the electrical output per optical input. Both parameters can be measured or obtained by design, which can allow a more accurate measurement of the optical power. For example, the tap ratio of the optical tap and/or a responsivity of the photodetector can be designed such that an output of the photodetector is a calibrated indication of a power of light traveling through the photodetector-enabled connector 104. Nevertheless, even without knowledge of these parameters, more light results in a higher reading of the power level, and it may be possible to implement a calibration phase to obtain a more precise relationship between the two values.

Figure 5:
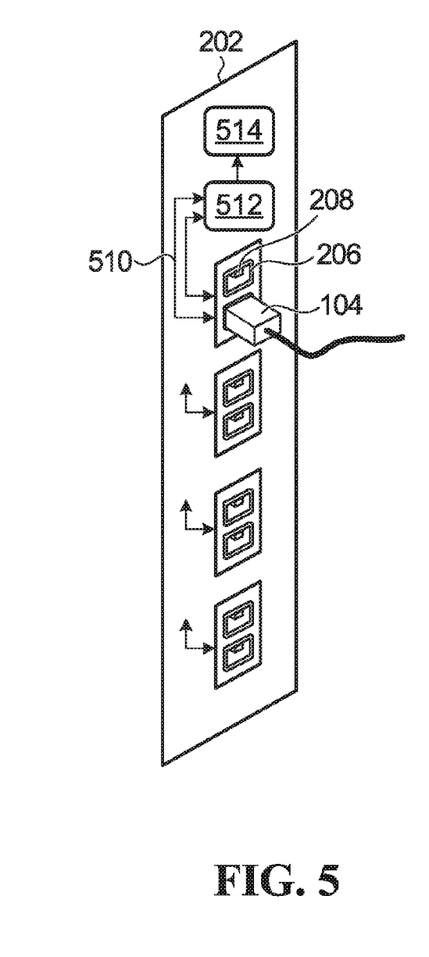

With specific reference to FIG. 5, a network of electrical connections 510 (e.g., wires, vias, layers, etc.) is embedded in the faceplate 202 and joins the adapter 206 (and other similar adapters, if applicable) to a processing unit 512 that is located on the faceplate 202. The processing unit 512 may include a microprocessor, a memory, I/O and other standard components. The processing unit 512 may apply a data processing function (e.g., algorithm) to the electrical signals received from one or more photodetector-enabled connectors (such as the photodetector-enabled connector 104) representing the output of one or more built-in photodetectors (such as built-in photodetector 124). The output of the data processing function may be a diagnostic or other feedback signal for user consumption. The feedback signal can be transmitted to an output device 514 also located on the faceplate 202. The output device 514 may be a LED, loudspeaker/sound alarm or other device that can be activated by the processing unit 512. In still other embodiments, the output device 514 may be a digital display to show, e.g., the power level of light (or OSNR of an optical signal) traveling through the photodetector-enabled connector 104.

In an embodiment, the output device 514 may have the capability to emit an output signal representative of the power level of light/OSNR of an optical signal that is passing through the adapter 206. Thus, the user is able to ascertain whether a connection is being made or not, and by controlling the light that passes through a connection that is thought to have been made, the user can confirm that the connection has indeed been made. Alternatively, since the processing unit 512 measures the level of light intensity passing through the built-in photodetectors 124, the processing unit 512 can therefore make an assessment, not only as to the presence of a connection between pairs of light-carrying fibers, but also as to the power level and/or optical signal-to-noise ratio (OSNR), which may be used to derive measures of the "quality" of the connections being made (e.g., connection established versus connection loss). Specifically, a quantitative measure of optical power in units of mW or dBm is provided at the processing unit 512. This information, in turn, can be used by the processing unit to emit the aforementioned feedback signal to the output device 514. In some cases, this can cause e.g., an alarm, for example in case an expected connection is not detected or if the power level/OSNR/quality of the connection is not sufficiently high (e.g., quantitative measure of optical power or optical signal-to-noise ratio is not above a threshold).

Figure 6:
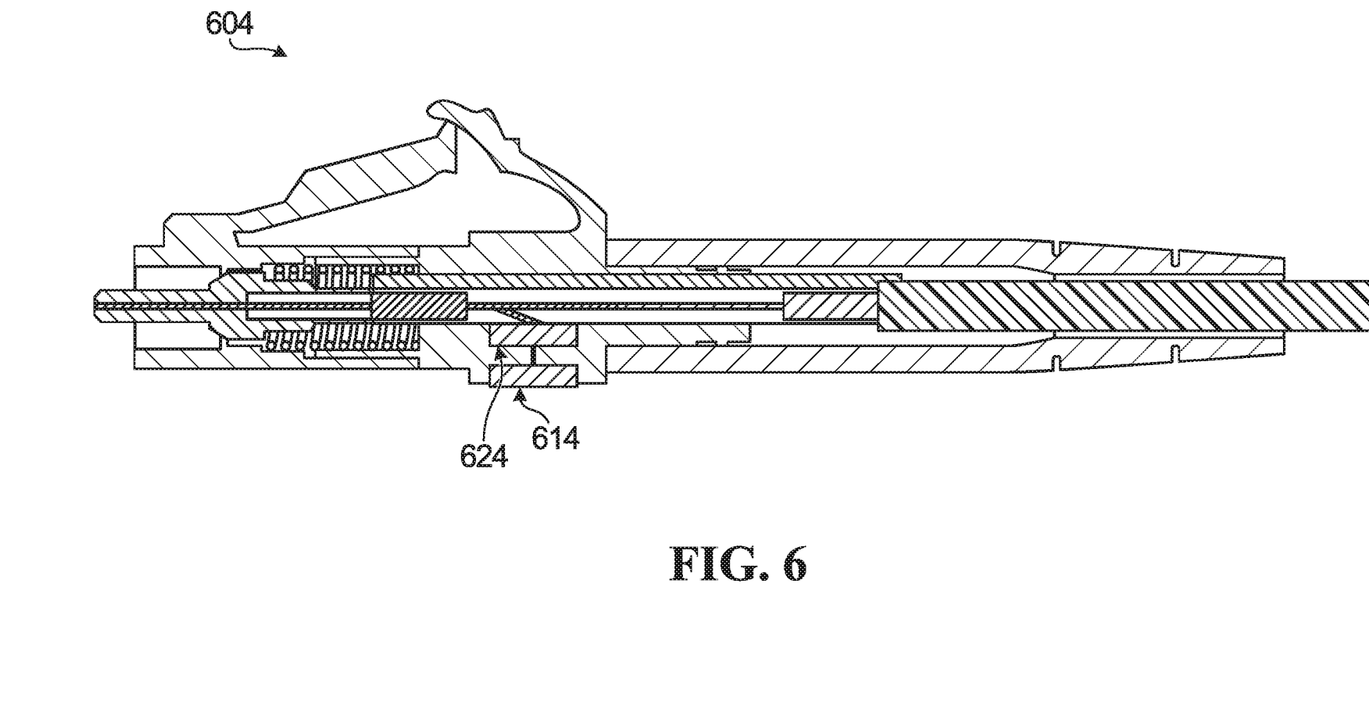
FIG. 6 shows an optical fiber cable terminated by a connector with a built-in photodetector in accordance with a further non-limiting embodiment wherein an output device is integrated with the connector.

The aforementioned embodiments have focussed on an active photodetector, however a passive photodetector could have been used. For example, in some embodiments, the photodetector-enabled connector 104 includes a built-in photodetector 124 that is passive, i.e., does not require an external source of power and thus does not require an electrode for transporting external power to the built-in photodetector 124. For example, with reference to FIG. 6, there is provided a photodetector-enabled connector 604 with a passive photodetector 624. The passive photodetector 624 may operate in a photovoltaic regime, or may draw power from light that is tapped from the main optical conduit via an optical tap 122. The tapped optical power may be photo-converted into an electrical power by the passive photodetector 624 or by a secondary photovoltaic cell (not shown). In either case, the output of the passive photodetector 624 may be used to control an integrated output device 614, such as a light-emitting device (e.g., LED) or sound-emitting device. The integrated output device 614 can appear on the periphery of the photodetector-enabled connector 604, for example. The photodetector-enabled connector 604 can therefore provide an output signal in the form of a perceptible indication via the external interface of the photodetector-enabled connector 604, in this case embodied in part by the integrated output device. This allows the user to establish, by simple inspection of the connector itself, whether it is properly connected.

Figure 7:
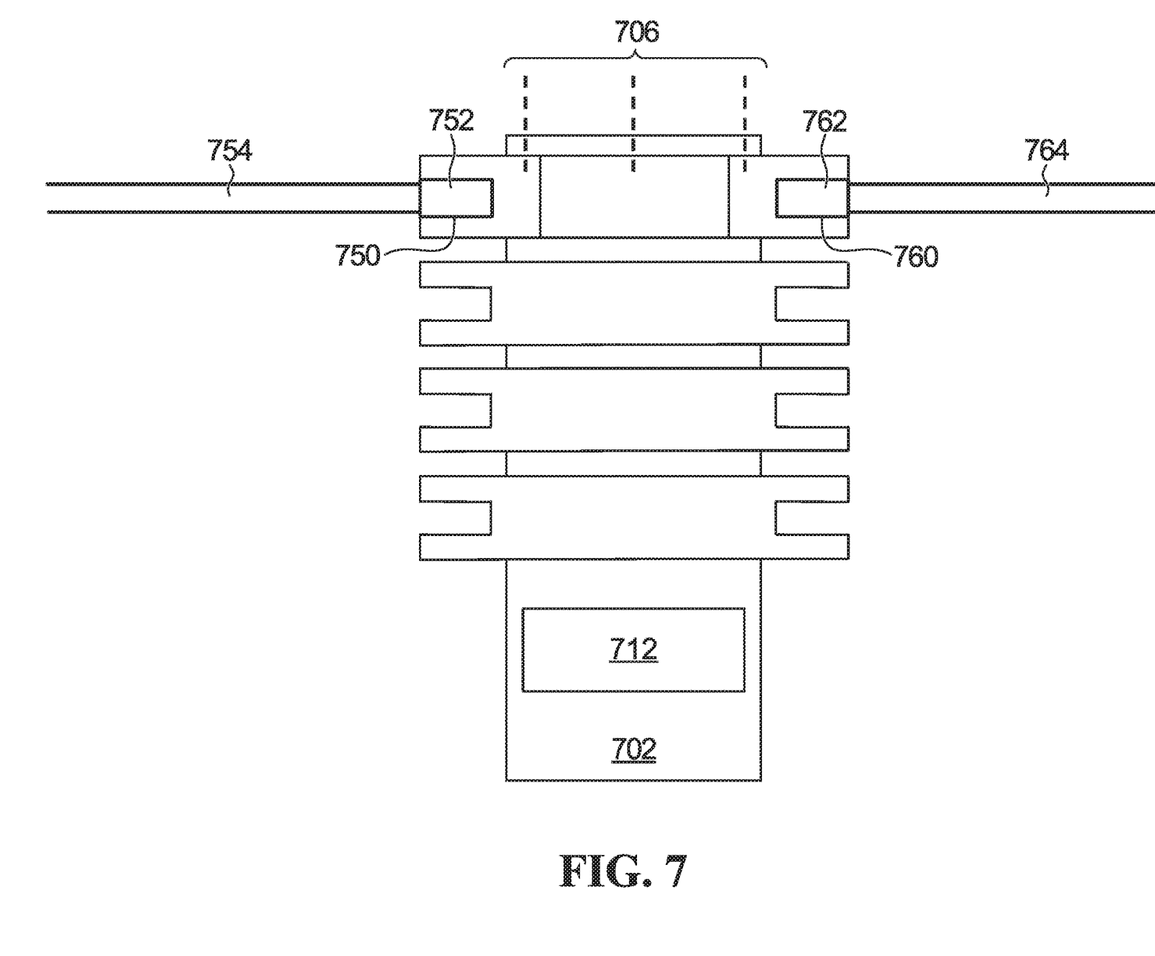
FIG. 7 shows an embodiment of a face plate with an adapter terminated by two interfaces for receiving connectors of two back-to-back fiber optic cables, in a non-limiting embodiment.

With reference to FIG. 7, a version of a faceplate 702 includes a double-sided adapter 706. Specifically, the double-sided adapter 706 has two interfaces 750, 760 for detachably receiving the connectors 752, 762 of respective fiber optic cables 754, 764. The connectors 752, 762 received on either side of the double-sided adapter 706 may have the same or different form factors and, accordingly, the two interfaces 750, 760 may have the same or different constructions. In an embodiment, the double-sided adapter 706 provides not only detachable mechanical connections to the connectors 752, 762, but also provides an optical connection between the connectors 752, 762. Additionally, in this embodiment, the double-sided adapter 706 has separate interfaces 750, 760 that are in electrical contact with electrodes that may be present on the two connectors 752, 762. That is to say, there is no requirement that the connectors 752, 762 be photodetector-enabled connectors equipped with electrodes, but if one or both of them is so equipped, the double-sided adapter 706 will allow an electrical connection to be established with the respective photodetector-enabled connector as described herein above. More particularly, the interfaces 750, 760 allow the signals generated by the passive photodetector that may be present within either or both of the connectors 752, 762 to be carried to a processing unit 712. The processing unit 712 may be located on the faceplate 702 as shown in FIG. 7, on an optical board connected thereto, or within a device connected over a data network.

As such, when there is an optical connection established by the double-sided adapter 706 between the two connectors 752, 762, and when both connectors are enabled with respective built-in photodetectors, this provides the processing unit 712 additional knowledge (and greater certainty) about that same optical connection. Alternatively, the use of a double-sided adapter 706 allows the use of unidirectional photodetectors in each connector 752, 762 (one for each direction), thus providing a complete picture of the quality of the optical connection in both directions of communication.

It will be noted that in certain embodiments, the adapters described herein may fulfill the function of establishing an optical connection with the fiber of an optical connector regardless of whether the optical connector includes or lacks a built-in photodetector. This can be achieved by designing photodetector-enabled connectors with a form factor identical to that of a standard optical connector (corresponding to the form factor of a photodetector-less connector that the adapter 706 might otherwise be expected to receive). In that way, the user does not need to concern himself or herself with the ability to establish an optical connection when photodetector-less connectors are used. Rather, the user may seamlessly use the adapter 706 for various uses, and benefit from enhanced monitoring functionality when photodetector-enabled connectors are indeed used.

Non-limiting examples of form factors (external dimensionality) that the photodetector-enabled connector may be adapted to have include:
FC
SC
ST
LC
MU
DIN
MTRJ
D4
MPO Individual connectors also have variants, such as, in the case of SC: SC-MM, SC-DX, SC-APC and SC-0.9, as will be known to those skilled in the art. There is no particular limitation on the form factor standard or variation thereof that may be used when designing the mechanical connection elements of the photodetector-enabled connector. In fact, in other embodiments, the form factor of the photodetector-enabled connector could be an as yet non-standardized form factor or a completely new form factor.

Figure 8:
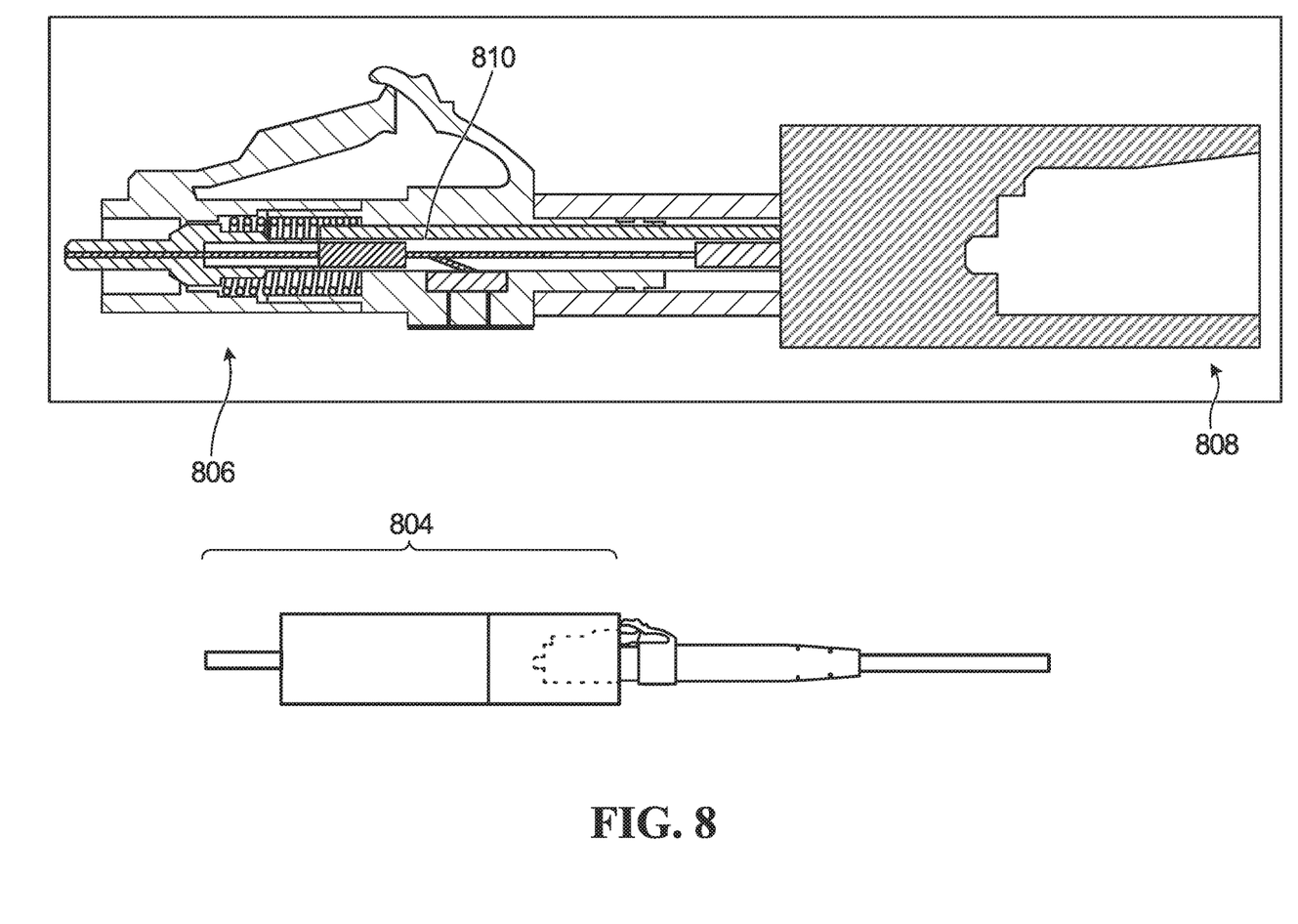
FIG. 8 shows a non-limiting embodiment of an optical connector having a sleeve for receiving a standard optical fiber cable.

In a further embodiment, photodetector-less connectors are used with the adapters as described herein to verify the quality of the optical connections made by such photodetector-less connectors. This is achieved by providing an extension connector. With reference to FIG. 8, an extension connector 804 has a connector end 806 and a sleeve end 808. The sleeve end 808 detachably receives a standard (photodetector-less) connector (not shown), such as may terminate a standard fiber optic cable. The sleeve end 808 therefore receives the extremity of a light-carrying fiber and is configured to channel this light into an internal light-carrying fiber 810 of the extension connector 804. The fiber 810 is coupled to an optical tap 122, which carries light to a built-in photodetector 124 as described herein above.

The connector end 806 may have a standard form factor. However, the form factor of the connector end 806 of the extension connector 804 may, but need not, be the same as the form factor of the standard optical cable that is received in the sleeve end 808. The connector end 806 may also additionally include the electrical interface 140 described herein above so as to make an electrical connection to a processing unit (not shown), thereby to allow signal flow and; or provision of a bias voltage. The extension connector 804 may thus enhance existing photodetector-less connectors on the market by providing them with the capabilities of a built-in photodetector and its attendant possibilities for monitoring, feedback etc.

Figure 9:
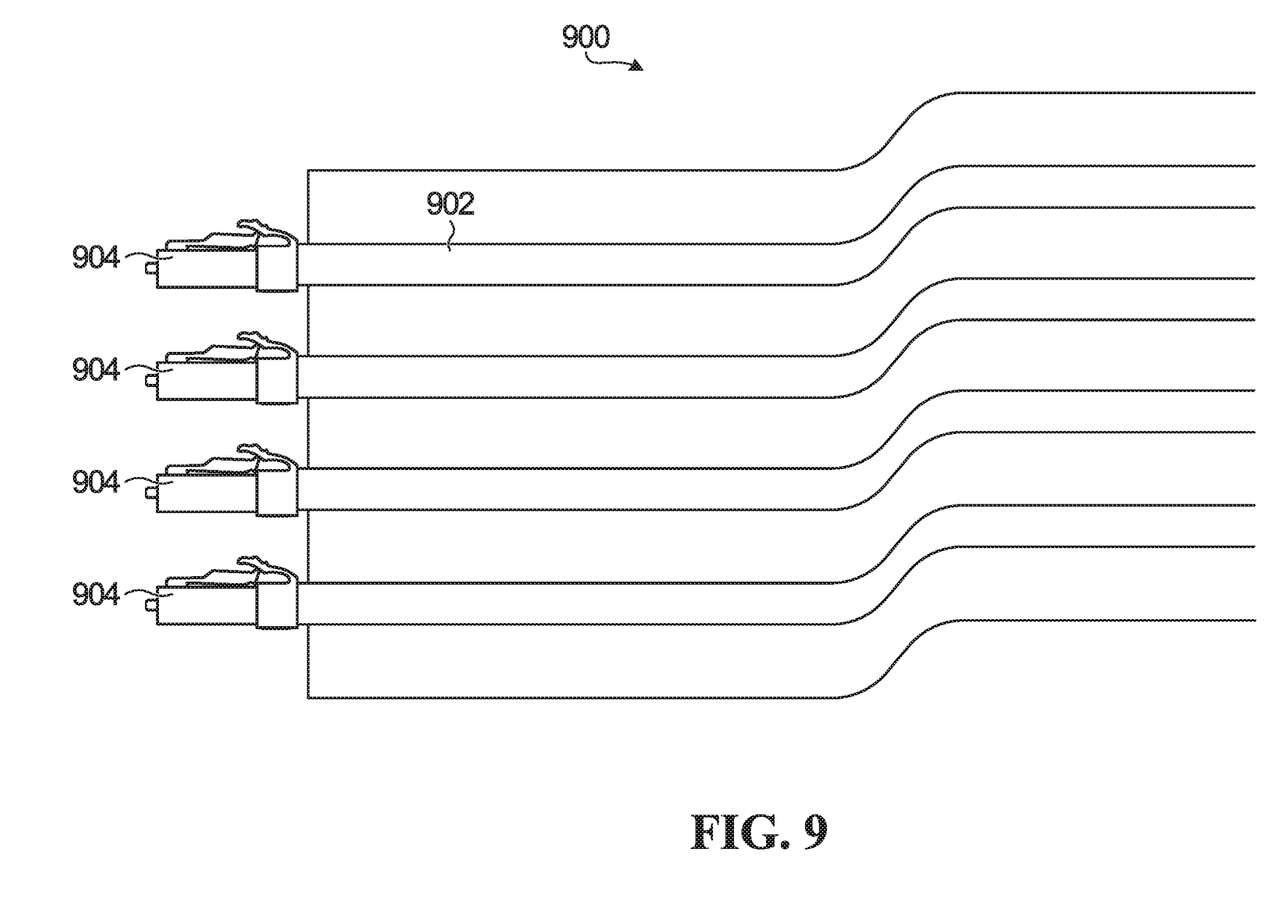
FIG. 9 shows a ribbon cable terminated by a plurality of connectors such as the connector of FIG. 1A, in a non-limiting embodiment.

It should be appreciated that in some embodiments, e.g., as shown in FIG. 9, a ribbon cable 900 carrying plural optical fiber cables 902 in parallel may incorporate certain aspects of certain embodiments of the present invention. For example, the ribbon cable 900 may be terminated by a plurality of connectors 904, each of which may be a photodetector-enabled connector as described herein, and yet retain a standardized form factor.

While the above description and diagrams have provided a description and illustration of several example embodiments, it should be appreciated that variations are possible while remaining within the scope of the invention. For example, certain elements that are expected to be known or common to a person of ordinary skill in the art have not been described, while certain features that have been described may be omitted in some embodiments and included in others. Those skilled in the art will of course appreciate that the invention is only to be limited by the claims attached hereto.

We claim:

1. An optical connector comprising:
   a first end comprising an external interface, the external interface comprising a light-carrying port, mechanical connection elements and an electrical interface, the external interface being configured to be detachably received by an adapter;
   a second end integrated with an optical fiber cable;
   a main optical conduit comprising a first length of optical fiber and a second length of optical fiber aligned and joined together at a splice point to form a continuous length of optical fiber for propagating light between the light-carrying port and the optical fiber cable; and
   a photodetector, connected to the optical fiber between the light-carrying port and the splice point, for detecting light travelling through the optical connector and providing a signal indicative of the detected light via the electrical interface.

2. The optical connector defined in claim 1, wherein the optical connector is an optical fiber connector.

3. The optical connector defined in claim 2, further comprising an optical tap coupled to the optical fiber for tapping a portion of the light, wherein the photodetector is coupled to the optical tap for detecting the tapped portion.

4. The optical connector defined in claim 3, wherein the optical fiber comprises a core and a cladding surrounding the core, wherein the optical tap comprises a portion of the cladding having a varied refractive index for tapping the light.

5. The optical connector defined in claim 3, wherein the optical tap comprises a Bragg grating in the optical fiber, configured for tapping the light.

6. The optical connector defined in claim 3, wherein the optical tap comprises a directional optical coupler.

7. The optical connector defined in claim 3, wherein at least one of a tap ratio of the optical tap and a responsivity of the photodetector is such that an output of the photodetector includes a calibrated indication of a power of light traveling through the optical connector.

8. The optical connector defined in claim 1, further comprising an wherein the external interface is configured to convey the signal and the signal is further indicative of an output of the photodetector.

9. The optical connector defined in claim 8, wherein the signal is an electrical signal and wherein the electrical interface comprises an electrode.

10. The optical connector defined in claim 9, wherein the electrode is disposed at a periphery of the connector.

11. The optical connector defined in claim 8, wherein the signal is an optical signal and wherein the external interface further comprises a light-emitting device.

12. The optical connector defined in claim 11, wherein the light-emitting device is a light-emitting diode.

13. The optical connector defined in claim 8, wherein the signal is an audible signal and wherein the external interface further comprises a sound-emitting device.

14. The optical connector defined in claim 1, further comprising a circuit configured for processing an output of the photodetector to generate an output signal.

15. The optical connector defined in claim 14, wherein the external interface is configured to convey the output signal.

16. The optical connector defined in claim 15, wherein the electrical interface comprises an electrode.

17. The optical connector defined in claim 1, wherein the photodetector is an active device.

18. The optical connector defined in claim 1, further comprising an electrode accessible from outside the connector and connected to the photodetector.

19. The optical connector defined in claim 18, wherein the electrode is configured to receive power from an external source for the photodetector.

20. The optical connector defined in claim 18, wherein the electrode is visible from inspection of an exterior of the connector.

21. The optical connector defined in claim 1, wherein the photodetector is a passive device.

22. The optical connector defined in claim 1, wherein the photodetector is configured to draw power from light tapped from an optical connection made by the connector when in use.

23. The optical connector defined in claim 1, wherein the first end comprises a form factor selected from a group consisting of FC, SC, ST, LC, MU, DIN, MTRJ, D4 and MPO.

24. The optical connector defined in claim 1, comprising a directional optical coupler configured to tap light traveling from the first end towards the second end.

25. The optical connector defined in claim 24, wherein the directional optical coupler is configured to tap light entering the connector at the second end.

26. The optical connector defined in claim 1, wherein the optical fiber cable comprises a plurality of optical fibers arranged in parallel, the photodetector being a first photodetector, the connector comprising a plurality of built-in photodetectors including the first photodetector wherein the connector is configured to tap light traveling through each optical fiber and couple the tapped light to a respective one of the plurality of photodetectors.

27. An optical connector responsive to light to generate an electrical signal, the connector comprising:
   a first end comprising an external interface, the external interface comprising a light-carrying port, mechanical connection elements and an electrical interface, the external interface being configured to be detachably received by an adapter;
   a second end integrated with an optical fiber cable;
   a main optical conduit comprising a first length of optical fiber and a second length of optical fiber aligned and joined together at a splice point to form a continuous length of optical fiber for propagating light between the light-carrying port and the optical fiber cable; and
   a photodetector, connected to the optical fiber between the light-carrying port and the splice point, for detecting light travelling through the optical connector and providing a signal indicative of the detected light via the electrical interface.

* * * * *